No. 861,113. PATENTED JULY 23, 1907.
C. T. HAMILTON.
GUM PURIFIER.
APPLICATION FILED FEB. 2, 1906. RENEWED MAY 21, 1907.
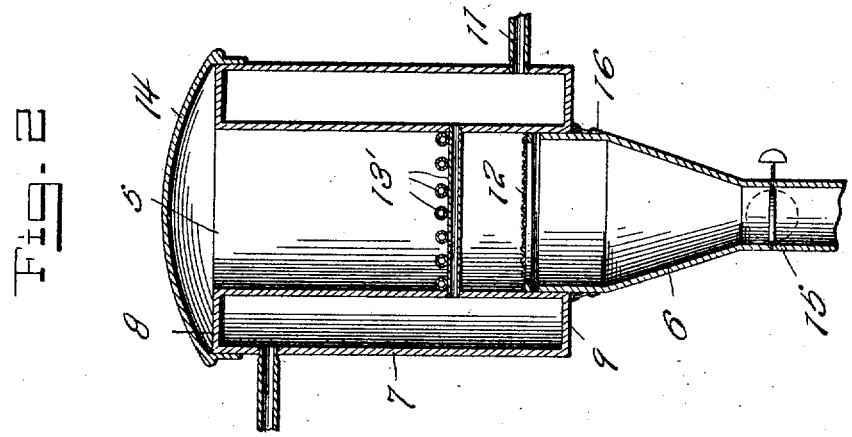
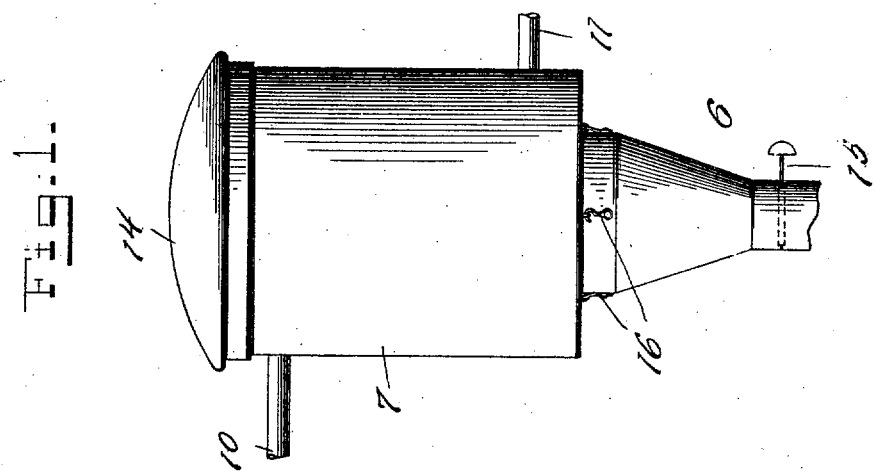
WITNESSES:
G. R. Thomas
F. C. Jones
INVENTOR
C. T. Hamilton
BY
Attorneys

UNITED STATES PATENT OFFICE.

CLARK T. HAMILTON, OF LANIER, GEORGIA.

GUM-PURIFIER.

No. 861,113.　　　Specification of Letters Patent.　　　Patented July 23, 1907.

Application filed February 2, 1906, Serial No. 299,168. Renewed May 21, 1907. Serial No. 374,925.

*To all whom it may concern:*

Be it known that I, CLARK T. HAMILTON, a citizen of the United States, residing at Lanier, in the county of Bryan, State of Georgia, have invented certain new and useful Improvements in Gum-Purifiers; and I do hereby declare the following to be a full, clear, and exact description of the invention, such as will enable others skilled in the art to which it appertains to make and use the same.

This invention relates to purifiers and more particularly to gum purifiers and has for its object to provide an apparatus especially adapted for use in the purification of so called rosin dross resultant from turpentine manufacture, and which will be arranged to separate the rosin from chips, sand and other foreign matter and to deliver the rosin practically pure.

Another object is to provide a purifier which will be extremely simple and which may be produced at low cost.

Other objects and advantages will be apparent from the following description.

In the drawings forming a portion of this specification and in which like numerals of reference indicate similar parts in the several views, Figure 1 is a side elevation of the present invention. Fig. 2 is a sectional view showing a form in which the upper grate bars are hollow and communicate with the steam chamber for the reception of steam therefrom.

Referring to the drawings, the present invention comprises a hollow vertical cylinder 5 in the lower end of which there is engaged a funnel 6. An outer casing 7 surrounds the cylinder 5 and is connected therewith by annular top and bottom walls 8 and 9 respectively to form a steam tight chamber between the cylinder and the casing, and with this chamber a steam supply pipe 10 communicates. A second steam pipe 11 communicates with the chamber and these pipes may be connected with a steam engine boiler or other source of steam to maintain the pressure within the chamber at the point of that within the boiler. Within the cylinder 5, just above the lower end thereof, there is a fine meshed screen 12, while a grating 13 formed of crossed hollow bars communicating with the steam jacket is located within the cylinder above the grating and in spaced relation thereto. A cover 14 is provided to close the upper end of the apparatus, and a gate 15 is provided for the funnel as its discharge spout.

In use, the dross is disposed within a cylinder 5 upon the grating 13 where it receives heat from the steam chamber and, melting, passes to the screen 12, the large particles of foreign matter being left upon the grating. From the screen, the melted gum passes therethrough into the funnel 6 and thence into receptacles disposed to receive it from the funnel, sand and other small particles of foreign matter being left upon the grating. The funnel 6 is detachable, being connected with the remainder of the apparatus by means of detachable fastenings 16 so that it may be removed to permit of cleaning the cylinder and gratings by means of a steam blast directed upwardly through the cylinder from a hose.

What is claimed is:

In an apparatus of the class described, the combination with a dross receptacle, of a steam jacket surrounding the receptacle, a grating located within the receptacle and comprising a plurality of hollow bars communicating with the steam jacket, a screen located below the grating, and a funnel disposed to receive matter passing from the screen.

In testimony whereof, I affix my signature, in presence of two witnesses.

CLARK T. HAMILTON.

Witnesses:
　JOS. W. DELK,
　A. S. PRIDDY.